United States Patent [19]

Falk et al.

[11] Patent Number: 5,212,610

[45] Date of Patent: May 18, 1993

[54] SCANNING DEVICE FOR MAGNETIC TAPE WITH SPECIAL BEARING ARRANGEMENT FOR SCANNER SHAFT

[75] Inventors: Gerhard Falk, Rossdorf; Hartmut Willmann, Gross-Zimmern; Wolfgang Fell, Seeheim, all of Fed. Rep. of Germany

[73] Assignee: BTS Broadcast Television Systems GmbH, Darmstadt, Fed. Rep. of Germany

[21] Appl. No.: 835,211

[22] Filed: Feb. 13, 1992

[30] Foreign Application Priority Data

Feb. 13, 1991 [DE] Fed. Rep. of Germany ....... 4104265

[51] Int. Cl.⁵ .................................................. G11B 5/52
[52] U.S. Cl. ..................................................... 360/107
[58] Field of Search ..................... 360/107, 130.24, 84, 360/85

[56] References Cited

U.S. PATENT DOCUMENTS 3,995,317 11/1976 Schmidt .............................. 360/107
4,285,016 8/1981 Gilovich .............................. 360/107
4,603,359 7/1986 Narasawa et al. ..................... 360/84
4,641,214 2/1987 Imanishi et al. ................ 360/130.24
5,086,361 2/1992 Kawada et al. ...................... 360/107

Primary Examiner—Robert S. Tupper
Attorney, Agent, or Firm—Frishauf, Holtz, Goodman & Woodward

[57] ABSTRACT

A scanning device for a magnetic tape recording and playback equipment of the oblique track type has a drive shaft (9) for a rotary head wheel (4) mounted in a duplex ball bearing (10) centered on the orbit plane of the magnetic heads which revolve on the circumference of the head wheel between the two halves of a tape-guiding drum. A support bearing (19) is affixed in the bottom of a housing (17) which houses the drive motor and is held in a downward extending socket at the bottom of the lower half of the drum. The housing can be tilt-shifted slightly for shifting the support bearing and then held, by three screws accessible from below, in the correct position for aligning the orbit of the magnetic heads in the gap between the two halves of the drum.

3 Claims, 2 Drawing Sheets

SCANNING DEVICE FOR MAGNETIC TAPE WITH SPECIAL BEARING ARRANGEMENT FOR SCANNER SHAFT

Cross reference to related application:

Application of Hartmut Willmann and Gerhard Falk Ser. No. 07/832 935, filed Feb. 10, 1992, claiming the priority of German Patent Appln. P 41 04 264.6, filed Feb. 13, 1991.

This invention concerns a scanning device of the kind utilizing a tape-guiding drum divided into fixed upper and lower drum separated by a gap through which magnetic heads affixed to the periphery of a rotating head wheel disk can scan a magnetic tape looped around the drum in a helical fashion. In such magnetic tape equipments, which are used for recording and playing back signals, usually color television signals, have a motor for driving the head wheel disk by means of a shaft which is provided with an upper and a lower bearing inside the tape guiding-drum.

BACKGROUND AND PRIOR ART

Such a scanning device is known from, for example, German patent document 26 09 335 C2. That device has an axial-pressure bearing with plane ball-guiding surfaces between a shell which houses that shaft bearing which is nearer to the head wheel disk, and an element for axially fixing and radially adjusting the shell. Three adjusting elements are distributed around the periphery of the tape-guiding drum, of which at least one adjusting element is provided with a plug that is longitudinally shiftable by means of a threaded pin which is beveled at one end and cooperates with a phase of the shell.

U.S. Pat. No. 4,641,214 discloses a rotary head device in which a shaft is clamped between two fixed and coaxially disposed drums. A rotary body for holding the magnetic heads is mounted on the shaft by means of two ball bearings spaced apart from each other. Both of the above-mentioned devices require ball bearings of the highest precision. In order to limit the play between the inner and outer ring of a ball bearing, it is known to cause the inner ring to bear against the outer ring by means of a limited spring effect provided on the inner ring. In the case of two ball bearings disposed at a certain distance from each other, this effect is obtained by providing that respective inner rings of both ball bearings are longitudinally shiftable on the shaft, while along each of the inner rings a compression spring is provided to provide the desired bearing race bias force. There is a disadvantage, however, that thermally caused changes or wear of the ball races produce height fluctuations of the magnetic head orbit.

It is further known from U.S. Pat. No. 4,603,359 to provide a rotary head device with a fixed lower drum and a rotary upper drum which carries the rotating magnetic heads. In parallel surfaces of the lower and upper drum, ring-shaped grooves or traces are provided for seating an axial ball bearing. This known head device is subject to radial shock and is not suited for scanning oblique tracks which are only a few microns wide.

SUMMARY OF THE INVENTION

It is an object of the present invention to provide a scanning device of the general kind above mentioned which will reduce height changes of the orbit plane of magnetic heads distributed on the periphery of a head wheel disk.

Briefly, the drive shaft of the head wheel has a duplex ball bearing at the height of the orbit plane of the magnetic heads; the inner rings of the duplex ball bearing are affixed to the shaft and the corresponding outer rings are affixed to the lower drum, while the lower bearing of the shaft is a support bearing with protection against radially operating cross pressures on the shaft.

The scanning device of the invention has the advantage that thermally caused changes in height between the bearings of the shaft do not influence the height of the orbit plane of the rotating magnetic heads. Furthermore, by the locking connection (close interfitting) of the duplex ball bearing the effect of impacts on the magnetic head orbit plane is attenuated.

It is particularly useful to provide for radial shifting of a small support bearing for adjustment of the magnetic head orbit plane.

DRAWING

The invention is further described by way of illustrative example with reference to the annexed drawing in which:

FIG. 1 shows, partly in section, a side view of a scanning device for an oblique track magnetic tape recording and playback equipment, and FIG. 2 is a view from below of the scanning device of FIG. 1.

DESCRIPTION OF THE ILLUSTRATED EMBODIMENT

Figure 1:
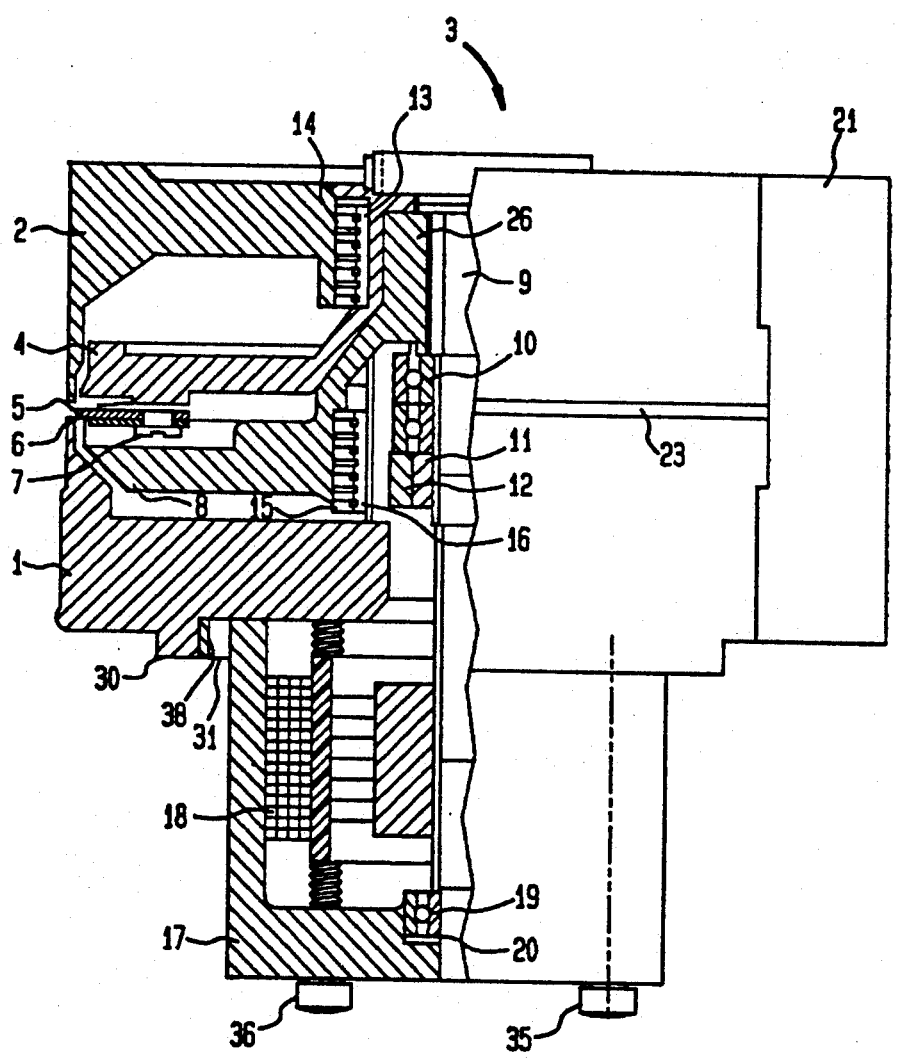

FIG. 1 shows a lower drum 1 and an upper drum 2 which together constitute a fixed tape-guiding drum 3. Coaxial alignment and fixation of the lower drum 1 and the upper drum 2 is provided by a closely fitting support bracket 21 having a prismatic support surface (not shown). Between the lower drum 1 and the upper drum 2 there is a gap 23 in which a head wheel 4, concentric to the two drums, turns with magnetic heads 5, each affixed to it at its circumference by means of a head carrier and 6, which is affixed by means of a screw 7 to the head wheel 4. The head wheel 4 rests on a positioning plate 8 that is integral with a tube 26 driven in rotary motion by the shaft 9.

The rotary support of the shaft 9 is provided by a so-called duplex ball bearing 10, i.e. a paired ball bearing which consists of two single-row grooved race ball bearings held closely fitting together. The clamping of the two ball bearings together is firmly defined. The location of the duplex ball bearing 10 on the shaft 9 is so provided that the bearing is centered at the height of the orbit plane of the magnetic heads 5. As a result of this precautionary provision, thermally caused length changes of the shaft 9 cannot cause any shift of the height of the orbit of the rotating magnetic heads. Similarly, it is unnecessary to consider the effect of wear of the ball races for producing any height shift of the magnetic head plane. The securing of the inner rings of the duplex ball bearing 10 is provided by a nut 11. The element 12 similarly secures the outer rings of the bearing 10.

The usual inductive transmission of recording signals furnished to recording magnetic heads is produced by an arrangement of rotary transformers which consists of rotors 13 and stators 14. The individual rotors 13 are affixed to the tube 26 by which the head wheel 4 is driven. The stators 14 are affixed to an inner bore at the top of the upper drum 2.

The carrier 6 is mounted below the head wheel and the magnetic head it carries is for playback. A playback rotary transformer arrangement, for inductive transmission of signals which playback magnetic heads produce, is located spatially separated from the recording side rotary transformers, by being located below the head wheel 4. The playback side inductive transmission arrangement consists of rotors 15 and stators 16. In contrast to the recording side inductive transmission arrangement, the playback side inductive transmission does not use rotary inner rings, but rather outer rings that are affixed to the already mentioned revolving support plate 8 provided for the head wheel 4, which hangs on the tube 26, so as to rotate with the shaft 9, whereas the inner rings (stators 16) of the playback inductive transmission arrangement are held fast on an outer wall of the shaft bearing 10 inside the lower drum 1.

The spatial separation between a playback signal transfer component and a recording signal transfer component of the inductive transmission or transfer arrangement has the advantage that the shielding effect of the head wheel 4 and its support plate 8 decouples the respective inductive signal transfer paths of the playback and recording sides. At the same time, this kind of construction makes possible a compact configuration of the scanning device of the present invention with the possibility of disposing a duplex ball bearing 10 in the orbit plane of the magnetic heads 5.

At the underside of the lower drum 1 a housing 17 is coaxially affixed in which a motor 18 is housed for driving the head wheel 4 by the shaft 9. The housing 17 also contains a support bearing 19 for the shaft 9. This support bearing 19 can for example be provided as a single-row grooved ball bearing which is biassed with a corrugated spring 20 located in a blind bore of the housing 17 which is centered on the shaft 9. The purpose of the support bearing 9 is merely to stabilize the orbit plane of the magnetic heads 5. There is the possibility of a corrective adjustment in a simple way by shifting of the support bearing 19 perpendicularly to the axis direction of the shaft 9. The support bearing 19 serves to oppose radially operating cross pressures on the lower end of the shaft 9. The shifting of the support bearing 19 in any direction perpendicular to the axis of the shaft 9 can align the plane of the orbit of the magnetic heads 5 parallel to the sides of the gap 23 between the upper and lower drums of the tape guiding drum assembly.

Figure 2:
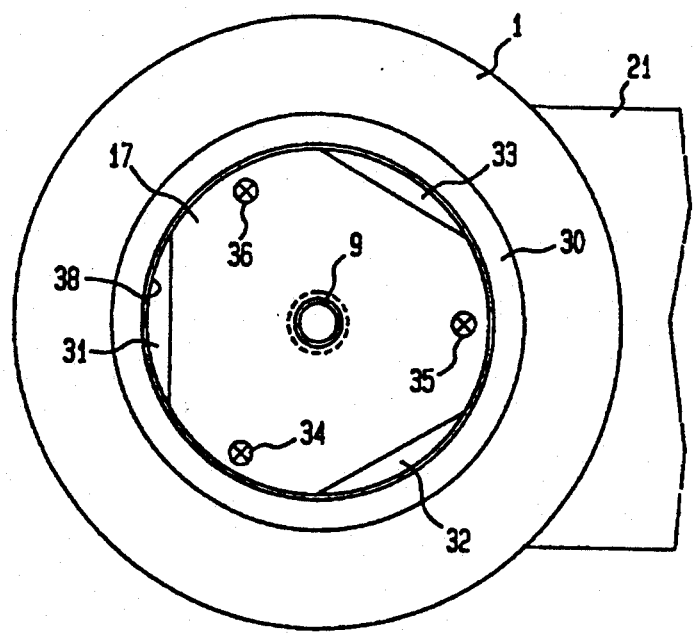

FIG. 2 shows a bottom view of the scanning device of FIG. 1 for the purpose of illustrating the means for shifting the bearing 19 of FIG. 1 so that the plane of the orbit of the magnetic heads will be aligned with the gap 23 between the drums 1 and 2. In FIG. 2 the same elements and features shown in FIG. 1 are given the same reference numerals. The downward cylindrical extension 30 on the bottom of the lower drum 1 appears as a ring in FIG. 2. The gap 31 shown in FIG. 1 between the cylindrical ridge 30 and the motor housing 17 is shown in FIG. 2 to appear only in certain sectors or segments of the housing 17. There are three such gaps 31, 32 and 33, only the first of which is in such a position as to be visible in FIG. 1. Passing through the housing 17 midway between adjacent gaps 31–33 are the screws 34, 35 and 36, only the last two of which are visible in FIG. 1, because the portion of the housing 17 that holds the screw 34 is cut away in FIG. 1 to show the cross section. The outer wall of the bearing 19 is shown in broken lines in FIG. 2 because it is not visible in that figure.

It can be seen in FIG. 2 that the housing 17 for the motor 18 fits into the ring-shaped projection 30 of the lower drum 1 only between the gaps 31, 32 and 33 and even then does not fit flush with the inner surface of the ridge 30 but is made to be of slightly smaller radius, permitting a resilient friction gasket 38 to be inserted inside the ring 30. The gaps 31, 32 and 33 are centered on radii that are 120° apart. The blade of a screwdriver can be inserted in any of these gaps and, by tilting the position screwdriver, the position of the casing 17 and thereby that of the shaft 9 can be shiftably adjusted. When the correct position has been found while the screws 34, 35 and 36 are retracted, that position can be permanently installed by carefully advancing the screws until all three bear against the bottom of the lower drum 1. The weight of the motor 18 may be supported against gravity on the shaft 9 and only held against rotation by the shaft by guides (not shown) on the inside of the housing 17, so that the friction gasket does not need to provide support to the motor 18 and can more easily permit adjustment of the position of the bearing 19. Additional top and bottom guides (not shown) inside the housing 17 could also be used to limit the vertical movement of the housing 17 relative to the motor 18, so that the housing 17 would not drop out of contact with the gasket 38. Such guides could be provided as clips or brackets inserted from outside the housing 17, to facilitate assembly and disassembly.

Along with the already mentioned advantages the invention has the further advantage that by the installation of a duplex ball bearing 10 the cost of mounting the shaft and head wheel can be reduced. The adjustment procedure that has been common up to now for setting the bias of the ball bearing can be dispensed with.

Although the invention has been described with reference to a particular illustrative example, it will be understood that modifications and variations are possible within the inventive concept.

We claim:

1. A scanning device for a magnetic tape equipment having a tape-guiding drum subdivided into fixed upper and lower drums, a rotating head wheel having magnetic heads on its periphery for scanning magnetic tape in a gap between said upper and lower drums, a motor for driving said head wheel disk by means of a shaft mounted coaxially with said tape guiding drum for rotation of said shaft and said head wheel driven by said motor, and further comprising an upper bearing located at a height on the axis of said tape guiding drum at which height the plane of rotation of said magnetic heads (5) is located, said upper bearing being a duplex ball bearing in which inner rings of the duplex ball bearing (10) are affixed to said shaft (9) and outer rings of said duplex ball bearing (10) are affixed to said lower drum (1) of said subdivided tape-guiding drum (3), and a lower bearing of said shaft (9) having the form of a supporting bearing (19) for opposing radially acting cross pressures to which said shaft (9) may be subjected.

2. The scanning device of claim 1, wherein said supporting bearing (19) is shiftably adjustable in directions perpendicular to the axis of said shaft (9).

3. The scanning device of claim 2, wherein said supporting bearing (19) is located in a downward extension of said lower drum which also houses said motor.

* * * * *